Sept. 17, 1940. J. A. SWEENEY Re. 21,574
SPECTACLE MOUNTING
Original Filed Dec. 12, 1938
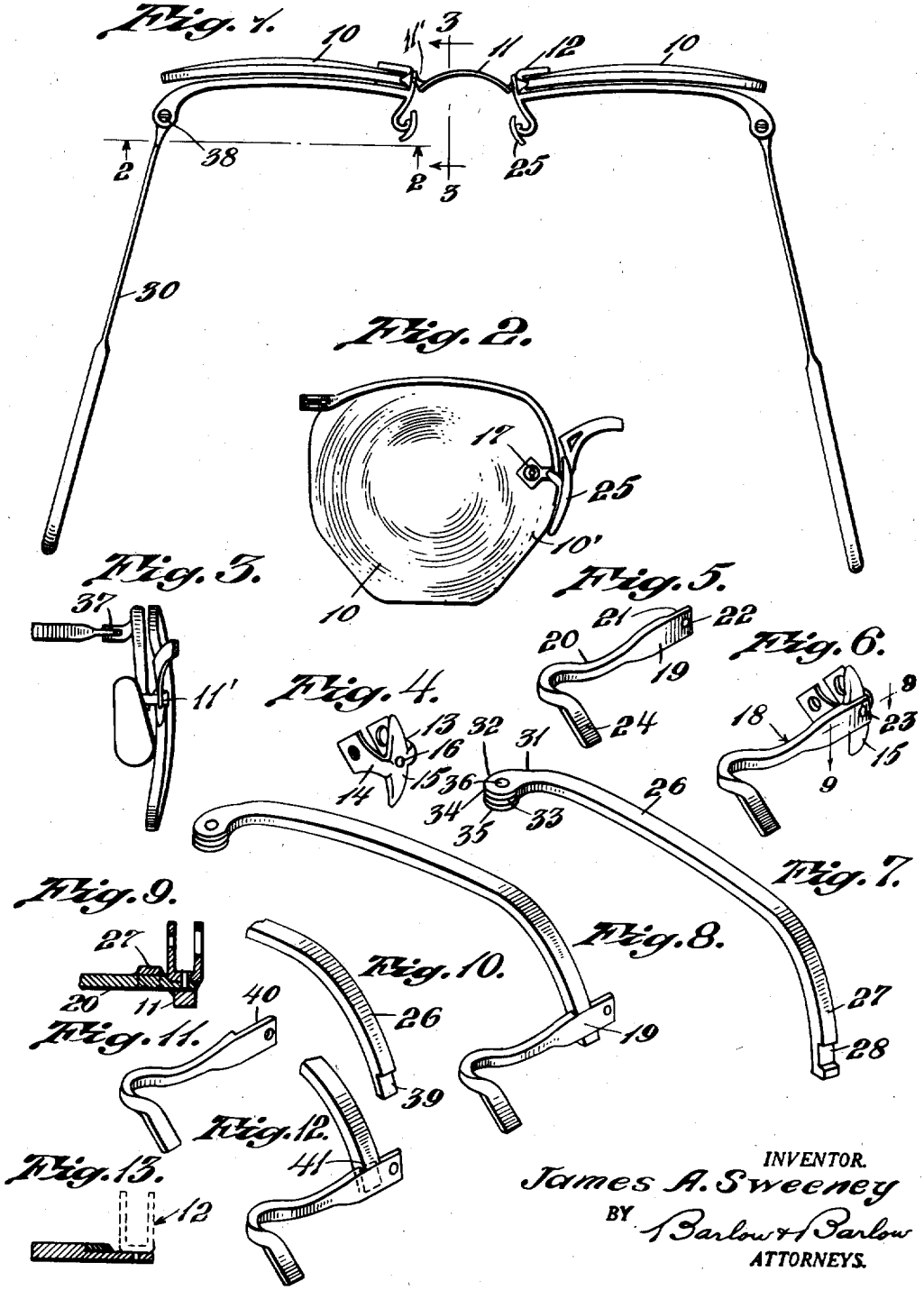
INVENTOR.
James A. Sweeney
BY Barlow & Barlow
ATTORNEYS.

Reissued Sept. 17, 1940

Re. 21,574

UNITED STATES PATENT OFFICE 21,574

SPECTACLE MOUNTING

James A. Sweeney, Providence, R. I., assignor to Universal Optical Corporation, a corporation of Rhode Island Original No. 2,194,776, dated March 26, 1940, Serial No. 245,092, December 12, 1938. Application for reissue May 4, 1940, Serial No. 333,400

3 Claims. (Cl. 88—47)

This invention relates to a spectacle, more particularly to the mounting of the temple of the spectacle, and has for one of its objects to provide a single point of attachment for the bridge and the temple mounting in order that the assembly operations may be reduced to a minimum.

Another object of the invention is to provide a mounting for the temple support member which will be simple in assembly and require no sharp bending operations of the support member.

Another object of the invention is to provide an attachment or anchor for the temple support member on the nose pad support arm and yet provide a mounting which will not be disturbed by adjustment of the nose pad.

With these and other objects in view, the invention consists of certain novel features of construction, as will be more fully described, and particularly pointed out in the appended claims.

In the accompanying drawing:

Fig. 1 is a top plan view of the spectacle equipped with this invention.

Fig. 2 is a rear view of a fragmental portion thereof from a point of observance substantially on line 2—2 of Fig. 1.

Fig. 3 is a sectional view of the spectacle on line 3—3 of Fig. 1.

Fig. 4 is a perspective view of the strap for the lens.

Fig. 5 is a perspective view of the nose pad support arm.

Fig. 6 is a perspective view of the assembly of these two pieces shown in Figs. 4 and 5.

Fig. 7 is a perspective view of the temple support member.

Fig. 8 is a perspective view of the temple support member assembled with the pad support arm.

Fig. 9 is a sectional view on line 9—9 of Fig. 6 and also showing a temple support member assembled on the arm as shown in Fig. 8, and the bridge which is assembled on the arm as shown in Fig. 3.

Fig. 10 is a perspective view of the temple support member modified in construction from that previously shown.

Fig. 11 is a perspective view of the pad support arm modified from the arrangement previously shown.

Fig. 12 is a perspective view of the assembly of the parts shown in Figs. 10 and 11, and Fig. 13 is a sectional view of the parts shown in Fig. 12 illustrating in dotted lines the position of the strap when connected thereto.

In constructions of this general character, it has heretofore been necessary to anchor the temple support member on a strap which engages the lens and to mount the pad support arm completely independent thereof, inasmuch as the pad support arm is adjusted through considerable extent to fit the faces of different wearers. This construction also required the sharp bending of the temple support member at its anchored end for the correct positioning thereof and in order to avoid such an arrangement, I have stiffened the pad support arm at its point of connection to the bridge or strap making the remainder of the arm relatively bendable so that any adjustment will occur beyond the stiffened portion leaving the stiffened portion fixed relatively to the lens and I have mounted the temple support member on the stiffened portion which affords a very simple assembly operation and positions the temple support member the distance desired rearwardly of the lens without any sharp bending to dispose a portion of it rearwardly at this point of connection, and the following is a more detailed description of the present embodiment of this invention, illustrating the preferred means by which these advantageous results may be accomplished:

With reference to the drawing, 10, 10 designates the lenses and 11 a bridge spanning the distance between the lenses and holding them a desired distance apart. Each strap 12 consists of a pair of arms 13 and 14 connected together by a shoe 15 which has a hole 16 therein utilized for mounting the strap upon another part. The nasal edge of the lens extends into the strap between the arms 13 and 14 and is there secured by a suitable screw 17 passing through the arms and lens between them.

A pad support arm 18 has a relatively widened portion 19 to cause the same to be relatively stiff and a narrower, thinner portion 20 which in comparison is relatively bendable. This stiffened portion 19 is reduced as at 21 for the reception of the shoe which is attached thereto. A dowel pin fitting in and extending from the opening 16 also fits into a hole 22 in this reduced portion of the arm for providing a simple manner of locating the parts to be soldered and also enables a subsequent soldering of the bridge 11 as at 11' to these previously soldered parts. This manner of connection enables the second soldering which necessarily must be at a temperature less than the fusion of the first soldering to be more readily and easily accomplished. The fit of the reduced portion 21 with the shoe 15 of the strap is such that the dowel pin 23 may be riveted to hold the parts in position if necessary. The end 24 of the nose pad support arm 18 is twisted and provides a good support for the nose pad 25 on the end of the arm.

The temple supporting member 26 is of wire and is bent to conform to the contour of the lens and extends just back of the lens following this contour of the lens. Its nasal or anchoring end portion 27 is connected to the stiffened portion of the nose pad support arm 18 by recessing the thicker temple support member as at 28 so as to receive this relatively thinner stiffened portion 19 of the pad support arm, the recess being of a depth equal to the thickness of the pad support arm to make a smooth surface at the junction. The temple support member is located the desired distance rearwardly from the lens along the support arm so that it may extend upwardly in substantially a single plane and then follow the contour of the lens both as to peripheral shape and as to curvature which may mean a bending in two different planes. The support member terminates in a position to support the temple 30 in a position above the sidewise vision of the wearer. The temple end of this support member 31 is enlarged as at 32 and slotted as at 33 forming ears 34 and 35 having registering openings 36. The flattened eye 37 of the temple is inserted between these ears and a screw 38 passes through the registering openings and is threaded into the ear 35 to provide a pivotal mounting for the temple.

In some cases instead of recessing the temple supporting member 26 in the form shown in Fig. 7 I may cut out a portion as at 39 to extend to the end of the member as in Fig. 10 and also extend the reduced portion 40 of the pad support arm so that these two parts may fit together as at 41, the length of this recess 40 being sufficient to accommodate the strap such as shown in Fig. 4.

In both of these arrangements illustrated, the temple support member is secured to a stiffened portion 19 of the pad support arm forming a rigid anchor for this end of the temple support member and maintaining it in fixed position relative to the lens even though the pad support arms are bent for accommodation of the pads to the faces of different wearers.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A spectacle construction comprising a pair of lenses, a bridge, means connected to the bridge and engaging the nasal edges of the lenses, a pair of nose pad support arms extending rearwardly from the bridge and connecting means, each of said arms being provided with a relatively wide portion to cause the same to be relatively stiff adjacent the point of connection to the lens and having a narrower, thinner, portion which in comparison with said thick portion is relatively bendable, said thickened, stiffened portion being reduced for the reception of the lens connecting means, and a pair of temple supporting members, each recessed near the nasal edge of the lens and receiving in said recess said thickened, stiffened portion of the support arm for anchoring said support arm at one end adjacent said reduced portion of the support arm, and extending upwardly from said point of anchoring and following the contour of the lens adjacent to and along the rear surfaces thereof for connection at the temple of the spectacle.

2. A spectacle construction comprising a pair of lenses, means including a bridge and lens engaging means for connecting the lenses together, a pair of nose pad support arms extending rearwardly from the bridge and lens engaging means, each of said arms being provided with a relatively wide portion to cause the same to be relatively stiff adjacent the point of connection to the lens engaging means and having a narrower, thinner, portion which in comparison with said wider portion is relatively bendable, said wider stiffened portion being reduced for the reception of the lens engaging means, and a pair of temple supporting members, each crossing a support arm at substantially right angles near the nasal edge of the lens, one of said crossing portions being recessed and receiving in said recess the other crossing portion for anchoring said supporting member at one end adjacent said reduced portion of the support arm, and extending upwardly from said point of anchoring and following the contour of the lens adjacent to and along the rear surfaces thereof for connection to the temple of the spectacle.

3. A spectacle construction comprising a pair of lenses, means including a bridge and lens engaging means for connecting the lenses together, a pair of nose pad support arms extending rearwardly from the bridge and lens engaging means, each of said arms being provided with a relatively wide portion to cause the same to be relatively stiff adjacent the point of connection to the lens engaging means and having a narrower, thinner, portion which in comparison with said wider portion is relatively bendable, said wider stiffened portion being reduced for the reception of the lens engaging means and a pair of temple supporting members each crossing a support arm at substantially right angles near the nasal edge of the lens, each support arm being recessed and receiving in said recess the temple supporting member for anchoring said supporting member at one end adjacent said reduced portion of the support arm, and extending upwardly from said point of anchoring and following the contour of the lens adjacent to and along the rear surfaces thereof for connection to the temple of the spectacle.

JAMES A. SWEENEY.